United States Patent
Kim et al.

(10) Patent No.: US 12,375,325 B2
(45) Date of Patent: Jul. 29, 2025

(54) INTERFERENCE CANCELLATION CIRCUIT AND OPERATING METHOD THEREOF

(71) Applicant: SAMSUNG ELECTRONICS CO., LTD., Suwon-si (KR)

(72) Inventors: Daeyoung Kim, Suwon-si (KR); Joontae Kim, Suwon-si (KR); Hyunseok Yu, Suwon-si (KR); Youngik Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/505,927

(22) Filed: Nov. 9, 2023

(65) Prior Publication Data
US 2024/0179033 A1 May 30, 2024

(30) Foreign Application Priority Data

Nov. 10, 2022 (KR) .......... 10-2022-0149690
Jul. 14, 2023 (KR) .......... 10-2023-0092029

(51) Int. Cl.
*H04L 25/03* (2006.01)
*H04L 25/02* (2006.01)

(52) U.S. Cl.
CPC ...... *H04L 25/03006* (2013.01); *H04L 25/025* (2013.01); *H04L 2025/0349* (2013.01); *H04L 2025/03636* (2013.01)

(58) Field of Classification Search
CPC ... H04L 25/02; H04L 25/03; H04L 25/03006; H04L 25/03012; H04L 25/03019;
(Continued)

(56) References Cited

U.S. PATENT DOCUMENTS 6,408,021 B1 * 6/2002 Mehrabanzad ........ H04B 3/238
379/406.01
7,366,253 B2 * 4/2008 Kim ..................... H04B 1/7097
375/299
(Continued)

FOREIGN PATENT DOCUMENTS

EP 2577875 4/2013
JP 2020-520182 7/2020
(Continued)

OTHER PUBLICATIONS

Dabag et al., "All-digital cancellation technique to mitigate receiver desensitization in uplink carrier aggregation in cellular handsets," IEEE Transactions on Microwave Theory and Techniques, Dec. 2013, 61(12):4754-4765.
(Continued)

*Primary Examiner* — James M Perez
(74) *Attorney, Agent, or Firm* — Fish & Richardson P.C.

(57) ABSTRACT

Provided is an interference cancellation circuit including a relative delay control circuit receiving a first transmission signal of a first frequency, and a second transmission signal of a second frequency different from the first frequency and including a first delay buffer delaying the second transmission signal by a first delay time and a second delay buffer delaying the second transmission signal by a second delay time, a delay reference generation circuit generating respective reference signals by receiving the first transmission signal and the delayed second transmission signal from the relative delay control circuit, a weight control circuit updating a weight vector, a relative delay estimation circuit estimating a relative delay based on the reference signals, and an adaptive filter generating an interference model signal based on the weight vector and a first reference signal
(Continued)

of the reference signals and filter the interference model signal from a received signal.

20 Claims, 11 Drawing Sheets

(58) Field of Classification Search
CPC .......... H04L 25/03038; H04L 25/0305; H04L 25/03057; H04L 25/0307; H04L 25/0202; H04L 25/024; H04L 25/025; H04L 2025/03484; H04L 2025/03349; H04L 2025/03592; H04L 2025/03598; H04L 2025/03611; H04L 2025/03636; H04L 2025/03433; H04L 2025/03439; H04L 2025/03445; H04L 2025/03471
See application file for complete search history.

(56) References Cited

U.S. PATENT DOCUMENTS

| | | | | |
|---|---|---|---|---|
| 7,392,012 B2* | 6/2008 | Oh | ............... | H04B 7/0413 455/39 |
| 8,102,950 B2* | 1/2012 | Dent | ............... | H04J 13/00 375/262 |
| 8,874,153 B2* | 10/2014 | Bevan | ............... | H04B 1/10 455/295 |
| 9,065,519 B2* | 6/2015 | Cyzs | ............... | H04B 1/525 |
| 9,337,877 B2* | 5/2016 | Rozental | ............... | H04B 1/525 |
| 9,337,993 B1* | 5/2016 | Lugthart | ............... | H04L 27/38 |
| 9,660,690 B2* | 5/2017 | Talty | ............... | H04B 1/401 |
| 9,698,845 B2* | 7/2017 | Talty | ............... | H03F 3/24 |
| 9,768,916 B2* | 9/2017 | Yu | ............... | H04L 25/0204 |
| 10,141,961 B1* | 11/2018 | Huang | ............... | H04B 1/0475 |
| 10,236,933 B2* | 3/2019 | Chen | ............... | H04L 25/03006 |
| 10,237,109 B2* | 3/2019 | Wilson | ............... | H04L 25/0262 |
| 10,897,341 B2* | 1/2021 | Fleischer | ............... | H04B 17/104 |
| 11,689,256 B2* | 6/2023 | Zhong | ............... | H04L 5/0048 375/267 |
| 11,736,213 B2* | 8/2023 | Su | ............... | H04L 5/0094 370/252 |
| 11,811,471 B2* | 11/2023 | Zhong | ............... | H04L 25/0202 |
| 11,838,151 B1* | 12/2023 | Jones | ............... | H04L 25/0224 |
| 11,848,803 B2* | 12/2023 | Horn | ............... | H04L 25/03343 |
| 11,936,450 B2* | 3/2024 | Herschfelt | ............... | H04L 1/16 |
| 2001/0001616 A1* | 5/2001 | Rakib | ............... | H04L 1/006 375/259 |
| 2001/0024474 A1* | 9/2001 | Rakib | ............... | H04B 1/7087 375/259 |
| 2001/0046266 A1* | 11/2001 | Rakib | ............... | H04N 7/10 375/259 |
| 2002/0015423 A1* | 2/2002 | Rakib | ............... | H04J 13/004 370/503 |
| 2003/0156603 A1* | 8/2003 | Rakib | ............... | H04J 13/00 348/E7.07 |
| 2004/0022311 A1* | 2/2004 | Zerbe | ............... | H04L 25/03057 375/229 |
| 2009/0213922 A1* | 8/2009 | Dent | ............... | H04L 25/067 375/233 |
| 2012/0051475 A1* | 3/2012 | Hombs | ............... | H03H 21/0012 375/350 |
| 2013/0102254 A1* | 4/2013 | Cyzs | ............... | H04B 1/10 455/63.1 |
| 2015/0311931 A1* | 10/2015 | Rozental | ............... | H04B 1/709 375/343 |
| 2016/0080054 A1* | 3/2016 | Yu | ............... | H04B 7/0456 370/280 |
| 2016/0315648 A1* | 10/2016 | Talty | ............... | H03F 3/24 |
| 2016/0315654 A1* | 10/2016 | Talty | ............... | H04L 25/02 |
| 2017/0077981 A1* | 3/2017 | Tobisu | ............... | H04B 1/0475 |
| 2017/0187513 A9* | 6/2017 | Bharadia | ............... | H04B 1/56 |
| 2018/0102807 A1* | 4/2018 | Chen | ............... | H04L 27/2657 |
| 2020/0304168 A1* | 9/2020 | Hur | ............... | H04B 1/0475 |
| 2021/0320694 A1* | 10/2021 | Zhong | ............... | H04L 25/03343 |
| 2022/0231890 A1* | 7/2022 | Horn | ............... | H04L 25/03343 |
| 2022/0239456 A1* | 7/2022 | Khandani | ............... | H04W 12/04 |
| 2022/0286172 A1* | 9/2022 | Herschfelt | ............... | H04L 25/021 |
| 2022/0329402 A1* | 10/2022 | Landis | ............... | H04W 72/51 |
| 2022/0329466 A1* | 10/2022 | Tarver | ............... | H04B 1/44 |
| 2023/0064117 A1* | 3/2023 | Zhong | ............... | H04L 25/0202 |
| 2024/0179033 A1* | 5/2024 | Kim | ............... | H04L 25/025 |
| 2024/0250854 A1* | 7/2024 | Kim | ............... | H04L 25/0244 |
| 2025/0038803 A1* | 1/2025 | Herschfelt | ............... | H04L 25/0202 |

FOREIGN PATENT DOCUMENTS

| | | |
|---|---|---|
| KR | 10-2022-0103322 | 7/2022 |
| WO | WO 2015/167812 | 11/2015 |

OTHER PUBLICATIONS

Gebhard et al., "A robust nonlinear RLS type adaptive filter for second-order-intermodulation distortion cancellation in FDD LTE and 5G direct conversion transceivers," IEEE Transactions on Microwave Theory and Techniques, 2019, 67(5):1946-1961.

Gerzaguet et al., "Performance of a digital transmitter leakage LMS-based cancellation algorithm for multi-standard radio-frequency transceivers," Digital Signal Processing, 2016, 1-14.

Ploder et al., "An adaptive machine learning based approach for the cancellation of second-order-intermodulation distortions in 4G/5G transceivers," 2019 IEEE 90th Vehicular Technology Conference, 2019, 8 pages.

Extended European Search Report in European Appln. No. 23209052.2, mailed on Apr. 17, 2024, 8 pages.

Kim et al. "Adaptive Time Synchronization between Transmitters in Digital Self-interference Cancellation Systems", 2023 IEEE 97th Vehicular Technology Conference (VTC2023-SPRING), IEEE, Jun. 20, 2023, retrieved on Aug. 15, 2023, pp. 1-7.

\* cited by examiner

INTERFERENCE CANCELLATION CIRCUIT AND OPERATING METHOD THEREOF

CROSS-REFERENCE TO RELATED APPLICATION

This application is based on and claims priority under 35 U.S.C. § 119 to Korean Patent Application Nos. 10-2022-0149690, filed on Nov. 10, 2022, and 10-2023-0092029, filed on Jul. 14, 2023, in the Korean Intellectual Property Office, the disclosures of which are incorporated by reference herein in their entireties.

BACKGROUND

A wireless communication system may employ various techniques to increase throughput. For example, the wireless communication system may employ a Carrier Aggregation (CA), an E-UTRA-UTRA NR Network Dual Connectivity (EN-DC), a Multiple-Input and Multiple-Output (MIMO), and the like, which increase communication capacity by using a plurality of antennas. With the adoption of techniques for increasing throughput, the transmitting side may be able to transmit signals with high complexity, while the receiving side may be required to process signals with high complexity.

Interference signals may prevent the receiving side from processing signals received through an antenna, and the interference signals may occur in various ways. For example, the interference signals may include inter cell interference, which is a signal received from a neighboring base station at the boundary of a serving base station, intra cell interference corresponding to radio signals from other terminals within a coverage of the serving base station, channel interference, and the like.

In addition to the interference signal received through the antenna, there is also an interference signal generated by leakage of the transmission signal into the reception path or by coupling of the transmission signal on the reception path within a terminal. In the case of self-interference signals generated within the terminal, the power-amplified transmission signal is fed back as an interference signal as it is, which may have a great impact on the deterioration of reception sensitivity. In this case, when a plurality of transmission signals are independently transmitted according to a transmission technique such as CA, EN-DC, and MIMO, a transmission frequency may be different for each of the plurality of transmission signals and passive interference due to intermodulation between the transmission signals of different frequencies may be additionally generated.

SUMMARY

The inventive concept provides an interference cancellation circuit and an operating method, which estimate a relative delay between transmission signals based on a least mean square (LMS) algorithm.

According to an aspect of the inventive concept, there is provided an interference cancellation circuit including a relative delay control circuit configured to receive a first transmission signal of a first frequency, and a second transmission signal of a second frequency different from the first frequency and include a first delay buffer that delays the second transmission signal by a first delay time and a second delay buffer that delays the second transmission signal by a second delay time, a delay reference generation circuit configured to generate respective reference signals by receiving the first transmission signal and the delayed second transmission signal from the relative delay control circuit, a weight control circuit configured to update a weight vector, a relative delay estimation circuit configured to estimate a relative delay based on the reference signals, and an adaptive filter configured to generate an interference model signal based on the weight vector and a first reference signal of the reference signals and filter the interference model signal from a received signal.

According to another aspect of the inventive concept, there is provided an interference cancellation circuit including a relative delay control circuit configured to receive a first transmission signal of a first frequency, and a second transmission signal of a second frequency different from the first frequency and include a first delay buffer that delays the second transmission signal by a relative delay and a second delay buffer that delays, again by an interference sampling period, the second transmission signal delayed by the relative delay, a delay reference generation circuit configured to generate a first reference signal by receiving the first transmission signal and the second transmission signal delayed through the first delay buffer and generate a second reference signal by receiving the first transmission signal and the second transmission signal delayed through the second delay buffer, a weight control circuit configured to update a weight vector, a relative delay estimation circuit configured to estimate a relative delay based on the first reference signal and the second reference signal, and an adaptive filter configured to generate an interference model signal based on the weight vector and the first reference signal and filter the interference model signal from a received signal.

According to another aspect of the inventive concept, there is provided an operating method of an interference cancellation circuit, the operating method including generating first to third reference signals, calculating a partial differential value for a relative delay of the first reference signal, calculating a partial differential value for a relative delay of a weight vector, and estimating the relative delay by using the partial differential value for the relative delay of the weight vector and the partial differential value for the relative delay of the first reference signal, wherein the first reference signal corresponds to a signal that is obtained by modelling an intermodulation interference based on a first transmission signal that is not delayed and a second transmission signal that is delayed by a relative delay, the second reference signal corresponds to a signal that is obtained by modelling an intermodulation interference based on the first transmission signal and the second transmission signal that is not delayed, and the third reference signal corresponds to a signal that is obtained by modelling an intermodulation interference based on the first transmission signal and a third transmission signal that is delayed by an interference sampling period.

BRIEF DESCRIPTION OF THE DRAWINGS

Implementations of the inventive concept will be more clearly understood from the following detailed description taken in conjunction with the accompanying drawings in which.

DETAILED DESCRIPTION OF THE EMBODIMENTS

Hereinafter, implementations of the inventive concept will be described in detail with reference to the accompanying drawings.

Figure 1:
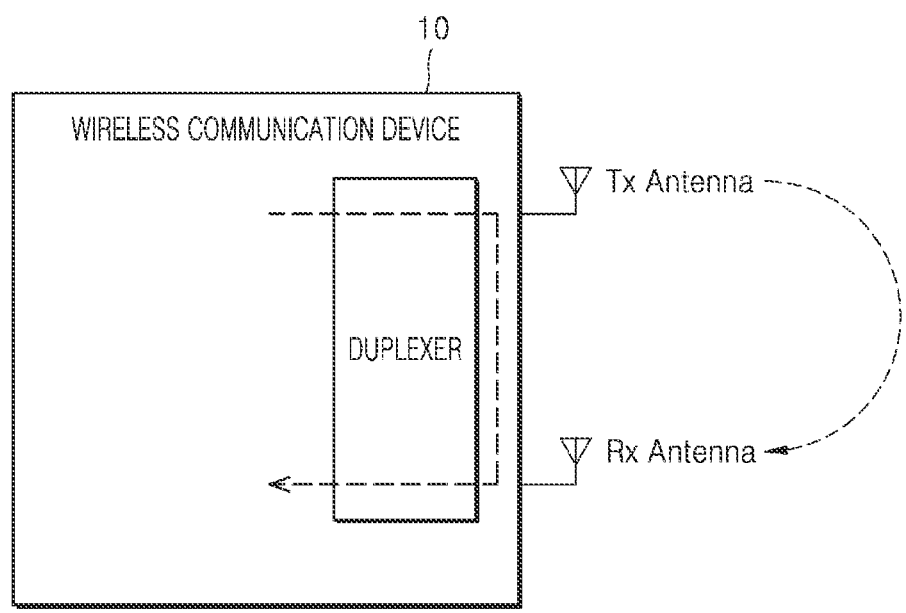
FIG. 1 is a block diagram illustrating an example of self-interference by a transmission signal.

FIG. 1 is a block diagram illustrating an example of self-interference by a transmission signal.

Referring to FIG. 1, a wireless communication device 10 may include a transmission antenna and a reception antenna. A single antenna may be connected to both a transmission radio frequency (RF) chain and a reception RF chain through a duplexer. For example, the wireless communication device 10 may receive a wireless signal through the reception RF chain in a receiving mode and may transmit a baseband signal to an external device through the transmission RF chain in a transmitting mode.

In the case of a wireless communication device 10 including a transmission antenna and a reception antenna connected through a duplexer, feedback of a transmission signal based on a transmission antenna and a reception antenna adjacent to each other may occur. However, since the duplexer is connected to both the transmission RF chain and the reception RF chain, at least a part of the transmission signal may leak from the transmission RF chain into the reception RF chain. When the leaked signal is input to the reception RF chain, self-interference may occur.

The reception antenna may receive a wireless signal transmitted from the transmission antenna as well as a wireless signal transmitted from the external device. For example, when the transmission antenna and the reception antenna correspond to non-directed antennas and the transmission antenna and the reception antenna are arranged to be adjacent to each other, some of the transmitted wireless signals may be fed back through the reception antenna. Self-interference may also occur based on the fed back wireless signal.

Figure 2:
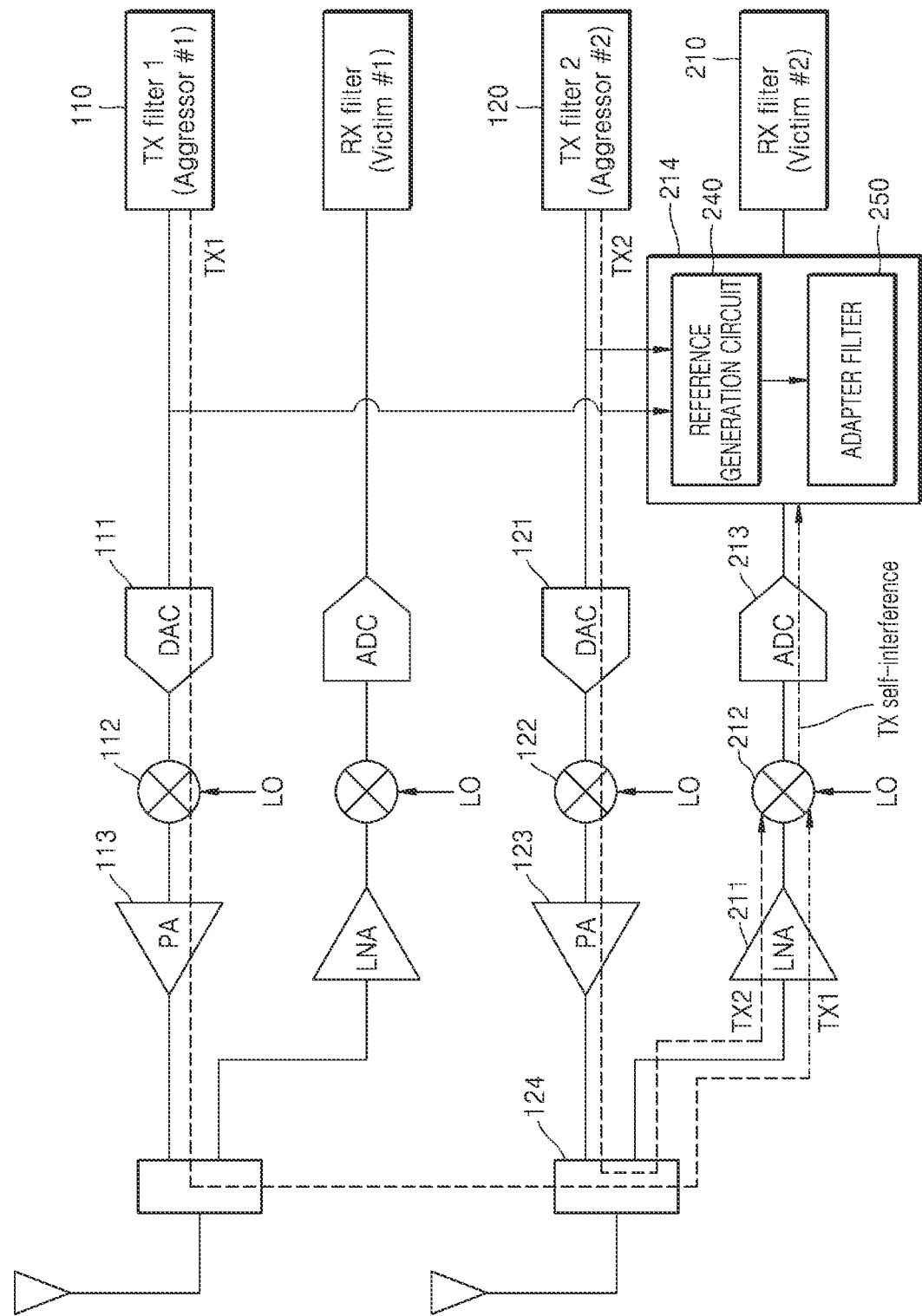
FIG. 2 is a block diagram illustrating a wireless communication device according to some implementations.

FIG. 2 is a block diagram illustrating a wireless communication device, such as the wireless communication device 10 of FIG. 1, according to some implementations.

Referring to FIG. 2, a first transmission signal TX1 and a second transmission signal TX2 may be transmitted. That is, the wireless communication device may include two antennas, and the two antennas may be antennas for transmitting and receiving signals.

For example, only a desired frequency band may be filtered from the first transmission signal TX1 through a first transmission filter 110 and a digital signal may be converted to an analog signal through a first digital to analog converter (DAC) 111. Thereafter, the transmission frequency of the first transmission signal TX1 may be upwardly converted by a local oscillator (LO) frequency received from an LO through a first mixer 112, amplified through a first power amplifier (PA) 113, and then transmitted to an external device (e.g., a base station) through an antenna. Only a desired frequency band may be filtered from the second transmission signal TX2 through a second transmission filter 120 and a digital signal may be converted to an analog signal through a second DAC 121. Thereafter, the transmission frequency of the second transmission signal TX2 may be upwardly converted by the LO frequency received by a second mixer 122, amplified through a second PA 123, and then transmitted to the external device through an antenna.

According to some implementations, the wireless communication device may perform carrier aggregation or dual connectivity, and the first transmission filter 110, the second transmission filter 120, and a reception filter 210 may all be in an on state. In this case, when self-interference occurs, the first transmission signal TX1 amplified through the first PA 113 may be coupled onto a neighboring reception RF chain. For example, the first transmission signal TX1 may be input to a low noise amplifier (LNA) 211 of the reception RF chain as a reception signal. In addition, the second transmission signal TX2 may leak from the transmission RF chain connected through a duplexer 124. That is, the second transmission signal TX2 may be input to the LNA 211 as a reception signal through the duplexer 124. The first transmission signal TX1 and the second transmission signal TX2 generate an interference signal near the reception frequency due to nonlinear characteristics of the reception RF chain, which may be converted downward again by the LO frequency received by a third mixer 212, and may be converted into a digital signal through an analog to digital converter (ADC) 213. Thereafter, the interference signal generated by the first transmission signal TX1 and the second transmission signal TX2 may be cancelled through an interference cancellation circuit 214.

The interference cancellation circuit 214 according to the some implementations may further include a reference generation circuit 240 and an adaptive filter 250. The reference generation circuit 240 may be a circuit for reproducing (or regenerating) an interference model by receiving the interference signal (e.g., the first transmission signal TX1 and the second transmission signal TX2). The reproduced interference model may include both an active interference signal and a passive interference signal. The adaptive filter 250 may generate an interference signal by estimating coefficients of the reference generation circuit 240 and may filter the interference signal by subtracting the interference signal from the received signal. For example, the adaptive filter 250 may be based on one of adaptive filter algorithms such as a Least Mean Square (LMS) algorithm, a Recursive Least Squares (RLS) algorithm, a dichotomous coordinate descent (DCD)-RLS algorithm, etc. using a stochastic gradient descent scheme.

Figure 3:
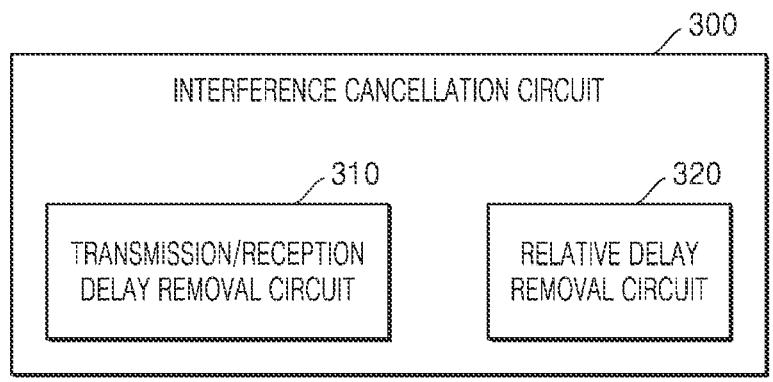
FIG. 3 is a block diagram illustrating an interference cancellation circuit according to some implementations.

FIG. 3 is a block diagram illustrating an interference cancellation circuit 300 according to some implementations.

Referring to FIG. 3, the interference cancellation circuit 300 may include a transmission/reception delay removal circuit 310 and a relative delay removal circuit 320. The interference cancellation circuit 300 of FIG. 3 may correspond to the interference cancellation circuit 214 of FIG. 2. The interference cancellation circuit 214 including the reference generation circuit 240 and the adaptive filter 250 of FIG. 2 is described in terms of an operational aspect of generating an interference reference signal by modeling the first transmission signal TX1 and the second transmission signal TX2 received by the interference cancellation circuit 214, and cancelling interference on the basis of the interference reference signal, and the interference cancellation circuit 300 of FIG. 3 is described in terms of a functional aspect of cancelling various types of interference.

The transmission/reception delay removal circuit 310 may remove interference due to a delay directly occurring on transmission/reception signals. According to some implementations, the interference channels of the first transmission signal TX1 and the second transmission signal TX2 may be changed in real time based on the on/off of the internal block of the wireless communication device. For example, analog blocks and digital blocks may be turned on/off repeatedly as idle-discontinuous reception (DRX), connected DRX (C-DRX), discontinuous transmit (DTX), and the like operate for low power of the wireless communication device. Whenever the analog blocks and the digital blocks are turned on/off, the magnitude and the phase of the interference channel are changed, and thus, self-delays of the first transmission signal TX1 and the second transmission signal TX2 may occur. The transmission/reception delay removal circuit 310 may cancel interference caused by transmission/reception delays that occur in real time based on the on/off of the analog blocks and the digital blocks of the wireless communication device.

According to some implementations, the first transmission signal TX1 and the second transmission signal TX2 may have different frequencies. When a relative delay occurs between the first transmission signal TX1 and the second transmission signal TX2 having different frequencies, the first transmission signal TX1 and the second transmission signal TX2 may generate intermodulation by mutual interference, resulting in an interference signal of an unexpected frequency component. Here, the relative delay indicates how much the second transmission signal TX2 is delayed compared to the first transmission signal TX1. For example, the frequency of the first transmission signal TX1 may be f1 and the frequency of the second transmission signal TX2 may be f2. In this case, a first intermodulation signal having a frequency of (2f1−f2) and a second intermodulation signal having a frequency of (2f2−f1) may be generated. The relative delay removal circuit 320 may cancel the intermodulation interference generated based on the relative delay between the first transmission signal TX1 and the second transmission signal TX2.

Figure 4:
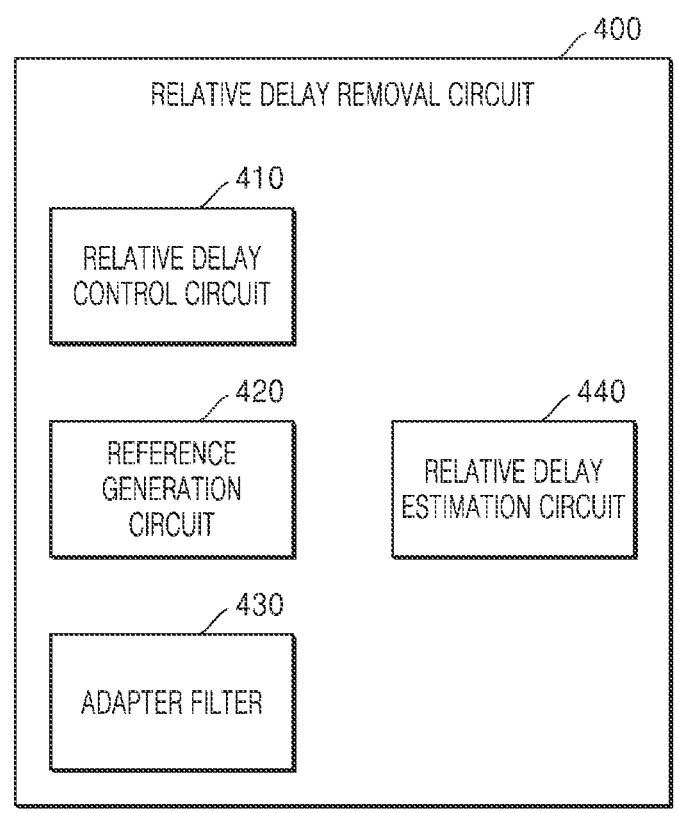
FIG. 4 is a block diagram illustrating a relative delay removal circuit according to some implementations.

FIG. 4 is a block diagram illustrating a relative delay removal circuit 400 according to some implementations.

Referring to FIG. 4, the relative delay removal circuit 400 may include a relative delay control circuit 410, a delay reference generation circuit 420, an adaptive filter 430, and a relative delay estimation circuit 440. The relative delay removal circuit 400 of FIG. 4 may correspond to the relative delay removal circuit 320 of FIG. 3.

According to some implementations, the relative delay control circuit 410 may receive a transmission signal, delay the transmission signal by a pre-stored value, and output the delayed transmission signal to the delay reference generation circuit 420. For example, the relative delay control circuit 410 may receive the first transmission signal TX1 and output the first transmission signal TX1 directly to the delay reference generation circuit 420 without delay. At the same time, the relative delay control circuit 410 may receive the second transmission signal TX2 and output the received second transmission signal TX2 to the delay reference generation circuit 420 after a time delayed by the first relative delay value. According to some implementations, the relative delay control circuit 410 may be implemented as a delay buffer and a fractional delay filter but is not limited thereto. The relative delay control circuit 410 may include all elements that receive a signal and delay the received signal by a predetermined size and then output the same.

According to some implementations, the delay reference generation circuit 420 may generate a reference signal. The delay reference generation circuit 420 may receive both the first transmission signal TX1 and the second transmission signal TX2 delayed by a relative delay value and output a reference signal. The reference signal may be a signal that is based on the generation of an interference model signal when there is a delay time as much as a relative delay value between the two input signals. According to some implementations, the relative delay removal circuit 400 may include at least two reference generation circuits. For example, one of the two or more reference generation circuits may set a different time to delay the second transmission signal TX2 for each update according to the updated relative delay value. The remaining reference generation circuits of the at least two reference generation circuits may delay the second transmission signal TX2 according to a fixed relative delay value. For example, the fixed relative delay value may be 0 and may be a sampling period $T_{tx\ inf}$ of the interference signal.

The adaptive filter 430 may generate an interference model signal by estimating the coefficient of the delay reference generation circuit 420. The adaptive filter 430 may generate an interference model signal by integrating a reference signal with a weight vector and subtract the interference model signal from the received signal. For example, the adaptive filter 430 may be based on an LMS algorithm using the stoichiometric gradient descent scheme. According to some implementations, the adaptive filter 330 may further include a finite impulse response (FIR) filter and a weight control circuit for updating a weight vector.

The relative delay estimation circuit 440 may estimate a relative delay value based on the reference signal. For example, the relative delay estimation circuit 440 may iteratively update the relative delay value for the interference reference signal based on the LMS algorithm. Details of updating the relative delay value will be described later.

Figure 5:
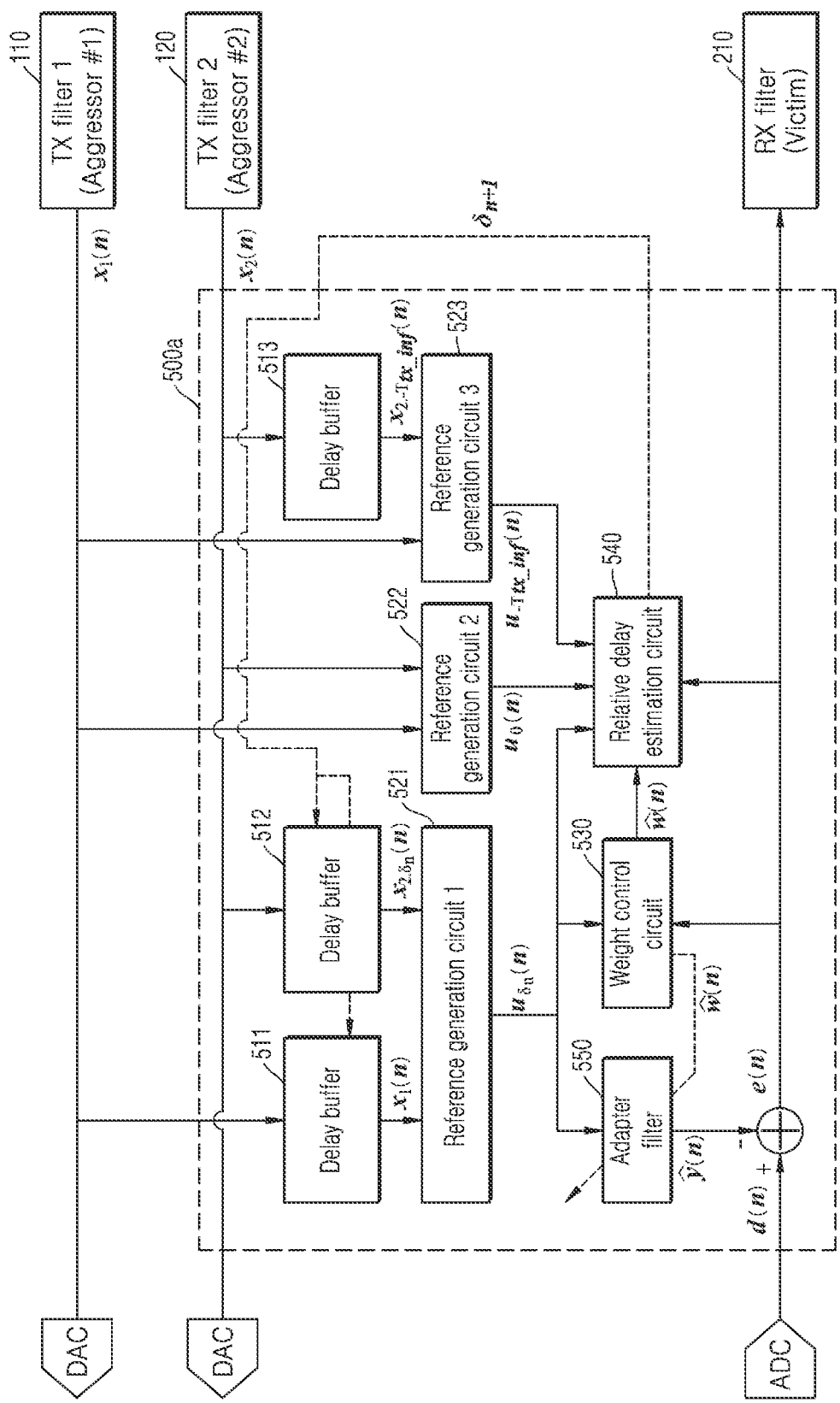
FIG. 5 is a block diagram illustrating a relative delay removal circuit according to some implementations.

FIG. 5 is a block diagram illustrating a relative delay removal circuit 500a according to some implementations.

Referring to FIG. 5, the relative delay removal circuit 500a may include a plurality of delay buffers 511 to 513; a plurality of reference generation circuits 521 to 523; a weight control circuit 530; a relative delay estimation circuit 540; and an FIR filter 550.

The relative delay control circuit 410 of FIG. 4 may comprise a plurality of delay buffers 511 to 513. The delay buffer 511 of relative delay control circuit 410 may receive the first transmission signal and output it directly to the delay reference generation circuit 420 without delay. The delay reference generation circuit 420 of FIG. 4 may include a first reference generation circuit 521, a second reference generation circuit 522, and a third reference generation circuit 523. The signal which is from the buffer 511 to the first reference generation circuit 521 without delay may be a first signal $x_1(n)$. In another example, the delay buffer 512 of the relative delay control circuit 410 may receive the second transmission signal TX2 and delay the second transmission signal TX2 by the first relative delay $\delta_n(n)$, and then output it to the second reference generation circuit 522. The signal that is delayed by the first relative delay $\delta_n(n)$ and output to the second reference generation circuit 522 may be a second signal $x_{2,\delta_n}(n)$. In another example, the delay buffer 513 of the relative delay control circuit 410 may receive the second transmission signal TX2 and delay it by the second relative delay $-T_{tx\_inf}(n)$, and then output it to the third reference generation circuit 523. The signal that is delayed by the second relative delay $x_{2,-T_{tx\_inf}}(n)$ and output to the third reference generation circuit 523 may be a third signal $x_{2,-T_{tx\_inf}}(n)$.

A first reference generation circuit 521 may generate a first reference signal $u_{\delta_n}(n)$ based on the first signal $x_1(n)$ and the second signal $x_{2,\delta_n}(n)$. The first reference signal $u_{\delta_n}(n)$ may be used to generate an interference model signal $\hat{y}(n)$ through a multiplication operation with a weight vector. In addition, the first reference signal $u_{\delta_n}(n)$ may be used to estimate the relative delay along with the second reference signal $u_0(n)$ generated by a second reference generation circuit 522 and the third reference signal $u_{-\sigma_{tx\_inf}}(n)$ generated by a third reference generation circuit 523.

The second reference generation circuit 522 may generate a second reference signal $u_0(n)$ based on the first signal $x_1(n)$ and a fourth signal $x_2(n)$. The first signal $x_1(n)$ may correspond to a signal such as the first transmission signal TX1 received without delay. The fourth signal $x_2(n)$ may correspond to a signal such as the second transmission signal TX2 received without delay. That is, the second reference generation circuit 522 may generate a second reference signal $u_0(n)$ based on the first transmission signal TX1 and the second transmission signal TX2 that are not delayed. The second reference signal $u_0(n)$ may be used to estimate the relative delay along with the first reference signal $u_{\delta_n}(n)$ generated by the first reference generation circuit 521 and the third reference signal $u_{-\sigma_{tx\_inf}}(n)$ generated by the third reference generation circuit 523.

The third reference generation circuit 523 may generate a third reference signal $u_{-\sigma_{tx\_inf}}(n)$ based on the first signal $x_i(n)$ and a third signal $x_{2,-\sigma_{tx\_inf}}(n)$. The third reference signal $u_{-\sigma_{tx\_inf}}(n)$ may be used to estimate the relative delay along with the first reference signal $u_{\delta_n}(n)$ generated by the first reference generation circuit 521 and the second reference signal $u_0(n)$ generated by the second reference generation circuit 522.

According to some implementations, an error signal $e(n)$ after removing the interference signal $\hat{y}(n)$ from the reception signal $d(n)$ may be as shown in the following Equation 1.

$$e(n)=d(n)-\hat{y}(n) \quad \text{[Equation 1]}$$

In order to adopt the LMS algorithm, the mean square error (MSE) of the error signal $e(n)$ may be set as a cost function. That is, the cost function may be the same as the following Equation 2.

$$J(n)=E[|e(n)|^2] \quad \text{[Equation 2]}$$

Here, $J(n)$ is the cost function, and E is an operator of Expected value function.

In addition, the interference model signal $\hat{y}(n)$ may be represented by the following Equation 3.

$$\hat{y}(n)=\hat{w}^H(n)u_{\delta_n}(n) \quad \text{[Equation 3]}$$

Here, $\hat{w}^H(n)$ is, as an estimated coefficient, a weight vector with N tap delay elements, and $u_{\delta_n}(n)$ is a first reference signal $u_{\delta_n}(n)$ to which the relative delay $\delta_n$ of a vector with N tap delay elements is applied.

According to some implementations, the weight control circuit 530 may update the weight by obtaining a gradient for the weight vector in Equation 3 and applying the gradient to the LMS algorithm. The weight update algorithm may be the same as the following Equation 4.

$$\hat{w}(n+1)=\hat{w}(n)+\mu u_{\delta_n}(n)e^*(n) \quad \text{[Equation 4]}$$

Here, $\mu$ is a step size. The weight control circuit 530 may provide the estimated weight vector $\hat{w}(n)$ to the relative delay estimation circuit 540. In addition, the weight control circuit 530 may provide the estimated weight vector $\hat{w}(n)$ to the adaptive filter 550 to generate the interference model signal $\hat{y}(n)$.

According to some implementations, the relative delay estimation circuit 540 may estimate a relative delay value based on reference signals. The relative delay estimation circuit 540 may iteratively update the relative delay value based on the LMS algorithm. For example, the relative delay estimation circuit 540 may update the relative delay $\delta_n$ by obtaining a gradient for the relative delay $\delta_n$ and applying it to the LMS algorithm. The update algorithm of the relative delay $\delta_n$ may be the same as the following Equation 5.

$$\delta_{n+1} = \delta_n - \frac{1}{2}v\frac{\partial J(n)}{\partial \delta} = \delta_n + v\Re\left\{e^*(n)\left[\frac{\partial \hat{w}^H(n)}{\partial \delta}u_{\delta_n}(n) + \hat{w}^H(n)\frac{\partial u_{\delta_n}(n)}{\partial \delta}\right]\right\} \quad \text{[Equation 5]}$$

Here, represents a step size for relative delay estimation and $\Re\{\ \}$ represents a real number part. That is, $$\frac{\partial u_{\delta_g}(n)}{\partial \delta}$$

as and $$\frac{\partial \hat{w}^H(n)}{\partial \delta}$$

should be obtained to update the relative delay $\delta_n$.

Hereinafter, in some implementations, for convenience of explanation, it will be described based on interference in the form of $x_1^2(t)x_2^+(t)$, which is one of the third nonlinear terms occurring at the frequency position of $2f_{\tau X1}-f_{\tau X2}$, but is not limited thereto. It will be obvious that it is scalable for all non-linear order terms and memory order terms according to some implementations.

According to some implementations, when the second transmission signal TX2 is delayed by the relative delay $\delta$ for the first transmission signal TX1, the reference signal $u_\delta(n)$ for the interference component of the third non-linear term is as follows.

$$u_\delta(n)=x_1^2(n)x_{2,\delta}^+(n) \triangleq [x_1^2(t_1)x_2^+(t_2)]_{t_1=n\tau_{rx},t_2=n\tau_{rx}+\delta} \quad \text{[Equation 6]}$$

Here, $x_1(n)$ represents the first transmission signal TX1 or the first signal that is obtained by passing through the first delay buffer 511, $x_2(n)$ represents the second transmission signal TX2, and $x_{2,\delta}(n)$ represents the second transmission signal TX2 that is delayed by the relative delay $\delta$ for the first transmission signal TX1 or the second signal that is obtained by passing through the second delay buffer 12.

Assuming that the relative delay $\delta$ is very small, the approximation may be possible as follows. Here, the relative delay $\delta$ represents the delay size based on the sampling period $T_{rx}$ of the reception filter 210.

$$u_\delta(n) = x_1^2(n)x_{2,\delta}^+(n) \quad \text{[Equation 7]}$$

$$\approx x_1^2(n)\{(1-\delta)x_2^+(n) + \delta x_2^+(n-1)\}$$

When Equation 7 is differentiated for δ, the following Equation 8 is obtained.

$$\frac{\partial u_\delta(n)}{\partial \delta} \leftrightarrows x_1^2(n)x_2^*(n-1) - x_1^2(n)x_2^*(n) \quad \text{[Equation 8]}$$

In general, since the bandwidth of the interference signal is large, the sampling rate in the plurality of reference generation circuits 521 to 523 may be higher than the sampling rate of the reception filter 210. Therefore, $x_{2-\tau_{tx\_inf}}(n)$, which is a signal that is separated by the interference sample period $T_{tx\_inf}$, may be used to obtain the approximation of $x_2(n)$, which is the second transmission signal TX2 delayed by the relative delay δ, and $$\frac{\partial u_\delta(n)}{\partial \delta}$$

may be approximated as follows.

$$\frac{\partial u_\delta(n)}{\partial \delta} \leftrightarrows \frac{T_{rx}}{T_{tx\_inf}}\left(x_1^2(n)x_{2,-T_{tx\_inf}}^*(n) - x_1^2(n)x_{2,0}^*(n)\right) = \quad \text{[Equation 9]}$$

$$\frac{T_{rx}}{T_{tx\_inf}}\left(u_{-T_{tx\_inf}}(n) - u_0(n)\right)$$

In other words, $$\frac{\partial u_\delta(n)}{\partial \delta}$$

may be calculated through approximation by multiplying a value that is obtained by dividing the sampling period $T_{rx}$ of the reception filter 210 by the sampling period $T_{tx\_inf}$ of the plurality of reference generation circuits 521 to 523 by a value that is obtained by subtracting the output $u_0(n)$ of the second reference generation circuit 522 from the output $u_{-\tau_{tx\_inf}}(n)$ of the third reference generation circuit 523.

The adaptive filter 550 may generate an interference model signal ŷ(n) based on the first reference signal $u_{\delta_n}(n)$ and the weight vector, and perform filtering of the interference signal by subtracting the interference model signal ŷ(n) from the received signal. The adaptive filter 550 may generate an interference model signal ŷ(n) by integrating an interference reference signal with a weight vector and subtract the interference model signal ŷ(n) from the received signal d(n). For example, the adaptive filter 550 may be based on one of adaptive filter algorithms such as the LMS algorithm, the RLS algorithm, and the DCD-RLS algorithm using a stoichiometric gradient descent method. According to some implementations, the adaptive filter 550 may further include an FIR filter and a control circuit for updating a weight vector.

According to some implementations, in order to calculate $$\frac{\partial \hat{w}^H(n)}{\partial \delta}$$

of Equation 5, the weight control circuit 530 may approximate $$\frac{\partial \hat{w}^H(n)}{\partial \delta}.$$

For example, when the Hermitian operation of Equation 4 is differentiated for the relative delay δ, the following Equation 10 is obtained.

$$\frac{\partial \hat{w}^H(n+1)}{\partial \delta} = \frac{\partial \hat{w}^H(n)}{\partial \delta}\left(I - \mu u_{\delta_n}(n)u_{\delta_n}^H(n)\right) + \quad \text{[Equation 10]}$$

$$\mu d(n)\frac{\partial u_{\delta_n}(n)}{\partial \delta} - 2\mu \hat{w}^H(n)\mathcal{R}\left\{\frac{\partial u_{\delta_n}(n)}{\partial \delta}u_{\delta_n}^H(n)\right\}$$

Here, I is a unit matrix. According to some implementations, differentiation of the Hermission operation of Equation 4 for the relative delay δ may cause complex calculation. Therefore, in order to reduce complexity, it may be assumed that the weight is stationary for the relative delay δ and is a continuous function. In this case, $$\frac{\partial \hat{w}^H(n)}{\partial \delta}$$

is as follows. Specifically, it is assumed that the weight vector ŵ(n) is a continuous function for the relative delay δ, in the same manner as approximation of the first reference signal $u_{\delta_n}(n)$ for the relative delay δ in Equation 7, and then approximation of the first reference signal for the relative delay δ and differentiation of the approximated result for the update relative delay is obtained as follows.

$$\frac{\partial \hat{w}^H(n)}{\partial \delta} \leftrightarrows \frac{\hat{w}_{\delta_n}^H(n) - \hat{w}_{\delta_{n-1}}^H(n)}{\delta_n - \delta_{n-1}} \quad \text{[Equation 11]}$$

Here, when $\hat{w}^H(n)$ is assumed to be stationary for the relative delay δ, and is $\hat{w}_{\delta_{n-1}}^H \approx \hat{w}_{\delta_{n-1}}^H(n-1)$, the weight vector may be described as follows.

$$\frac{\partial \hat{w}^H(n)}{\partial \delta} \leftrightarrows \frac{\hat{w}_{\delta_n}^H(n) - \hat{w}_{\delta_{n-1}}^H(n-1)}{\delta_n - \delta_{n-1}} \quad \text{[Equation 12]}$$

However, the value of $$\frac{\partial \hat{w}^H(n)}{\partial \delta}$$

may be obtained only when the relative delay $\delta_n$ changes for each sample, and when the relative delay $\delta_n$ does not change, the weight accumulated until the relative delay $\delta_n$ changes may be used as shown in the table below.

TABLE 1

| Step | Equation |
|---|---|
| | Initialization: $W_{prev} = 0$,<br>$W_{acc}(-1) = 0$, $D_{prev} = 0$<br>for $n = 0, 1, \ldots$<br>If $\delta_n \neq \delta_{n-1}$ $W_{prev} = W_{acc}(n-1)$<br>$W_{acc}(n-1) = 0$<br>$D_{prev} = \delta_{N-1}$<br><br>$\dfrac{\partial \hat{W}^H(n)}{\partial S} = \dfrac{\hat{w}^H_{\delta_n}(n) - W_{prev}}{\delta_n - D_{prev}}$<br><br>$W_{acc}(n) = \alpha \hat{w}^H_{\delta_n}(n) + (1-\alpha) W_{acc}(n-1)$ |

Figure 6:
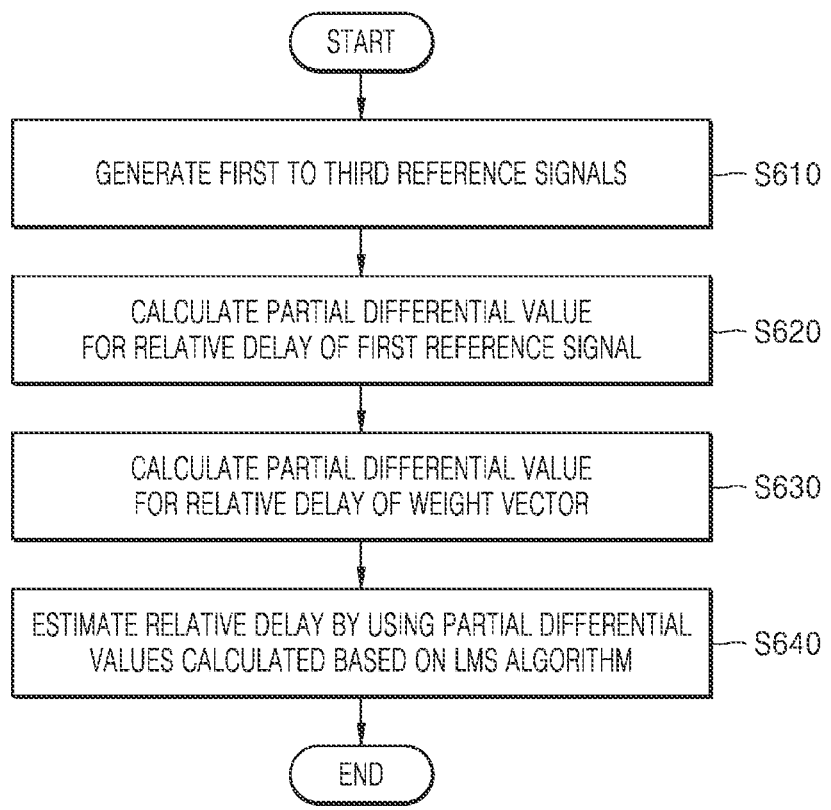
FIG. 6 is a flowchart illustrating a method of operating a relative delay removal circuit, according to some implementations.

FIG. 6 is a flowchart illustrating a method of operating a relative delay removal circuit 500a, according to some implementations.

Referring to FIG. 6, in operation S610, the relative delay removal circuit 500a may generate a first reference signal, a second reference signal, and a third reference signal. The first reference signal $u_{\delta_n}(n)$ may correspond to a signal for indicating interference by a first transmission signal TX1 delayed by 0 and a second transmission signal TX2 delayed by a relative delay. The second reference signal $u_0(n)$ may correspond to a signal for indicating interference by the first transmission signal TX1 delayed by 0 and the second transmission signal TX2 delayed by 0. The third reference signal $u_{-\tau_{tx\_inf}}(n)$ may correspond to a signal for indicating interference by the first transmission signal TX1 delayed by 0 and the second transmission signal TX2 delayed by the interference sampling period $T_{tx\_inf}$.

In operation S620, the relative delay removal circuit 500a may calculate a partial differential value for the relative delay of the first reference signal $u_{\delta_n}(n)$. According to some implementations, based on Equation 9, the partial differential value may be calculated through approximation by multiplying a value that is obtained by dividing the sampling period $T_{rx}$ of the reception filter 210 by the sampling period o$T_{tx\_inf}$ f the delay reference generation circuit 420 by a value that is obtained by subtracting the output $u_0(n)$ of the second reference generation circuit 522 from the output $u_{-\tau_{tx\_inf}}(n)$ of the third reference generation circuit 523.

In operation S630, the relative delay removal circuit 500a may calculate a partial differential value with respect to the relative delay of the weight vector. According to some implementations, the differentiation for the relative delay of the Hermission operation of Equation 4 may be directly calculated based on Equation 10, or the partial differential value for the relative delay of the weight vector may be calculated according to Equation 14, by using the accumulated weight vector only when the value of the relative delay changes according to Equation 15.

In operation S640, the relative delay removal circuit 500a may estimate the relative delay by using partial differential values calculated based on the LMS algorithm. For example, the relative delay may be estimated using Equation 5 derived based on the LMS algorithm, and in this case, $$\frac{\partial u_{\delta_n}(n)}{\partial \delta}$$

and $$\frac{\partial \hat{w}^H(n)}{\partial \delta}$$

calculated by approximating in operations S620 and S630 may be used.

Figure 7:
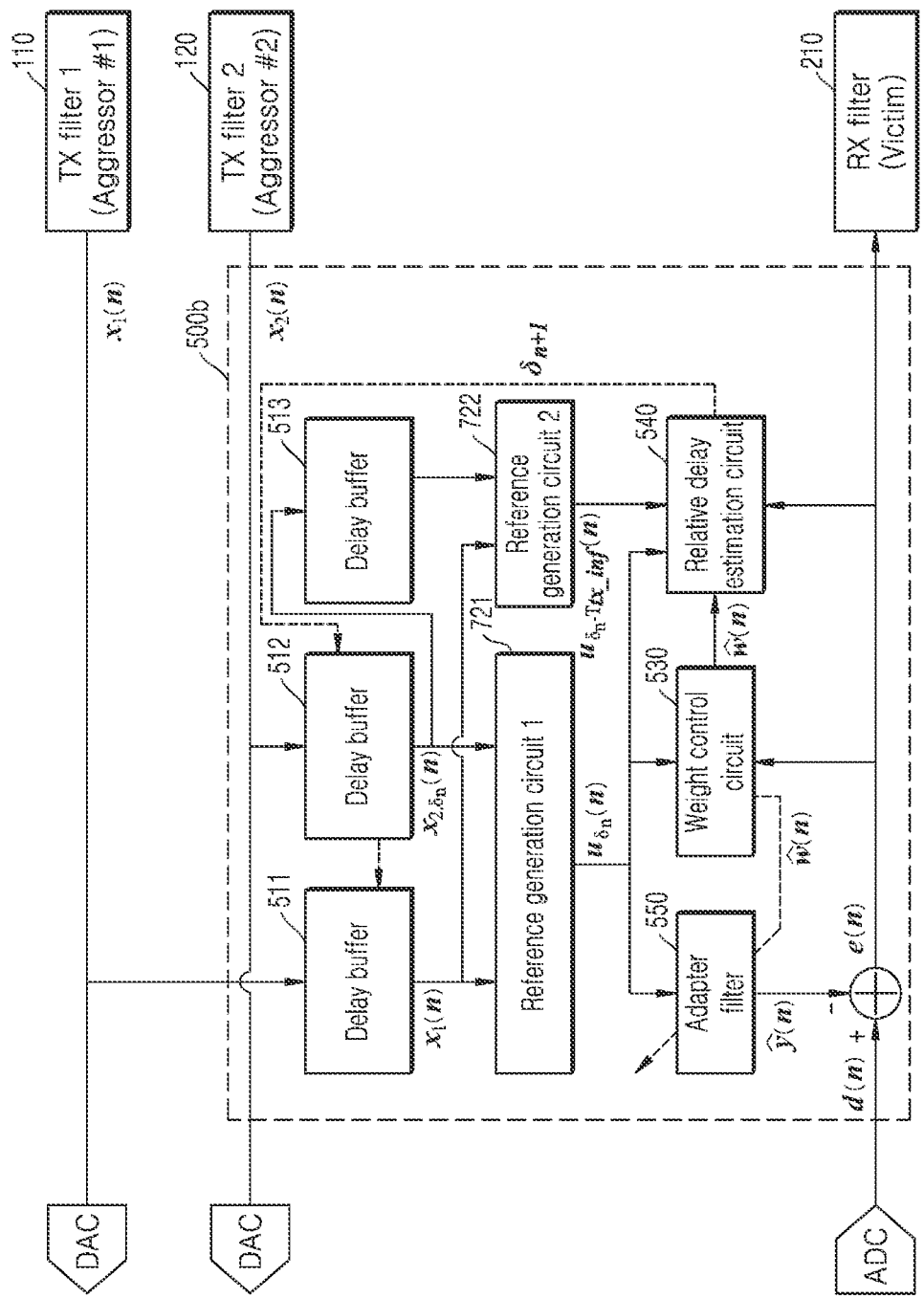
FIG. 7 is a block diagram illustrating a relative delay removal circuit according to some implementations.

FIG. 7 is a block diagram illustrating a relative delay removal circuit 500b according to some implementations.

Referring to FIG. 7, the relative delay removal circuit 500b may include two reference generation circuits 721 and 722. That is, a second reference signal for modeling interference based on the first transmission signal TX1 delayed by 0 and the second transmission signal TX2 delayed by 0 in FIG. 5 may be omitted.

According to some implementations, the relative delay removal circuit 500b may update the relative delay discretely without updating for each sample to reduce complexity. In this case, when the relative delay $\delta$ is based on the reference signal applied in advance, the second reference signal $u_0(n)$ of FIG. 5 may be omitted according to the following Equation 16.

$$\frac{\partial u_\delta(n)}{\partial \delta} \simeq \frac{T_{rx}}{T_{tx\,inf}} \left( x_1^2(n) x_{2,\delta-T_{tx\_inf}}^*(n) - x_1^2(n) x_{2,\delta}^*(n) \right) = \quad \text{[Equation 16]}$$

$$\frac{T_{rx}}{T_{tx\,inf}} \left( u_{\delta-T_{tx\_inf}}(n) - u_\delta(n) \right)$$

In other words, only the reference signal $u_{-\tau_{tx\_inf}}(n)$ delayed by the relative delay as much as $-T_{tx\_inf}$ may be required based on the reference signal $u_\delta(n)$ applied with the relative delay $\delta$ when $$\frac{\partial u_\delta(n)}{\partial \delta}$$

is obtained. According to some implementations, when the relative delay $\delta_n$ is updated in the delay buffer of the relative delay removal circuit 500b, correction for $\delta_n$ may be required as much as $\delta_n = \delta_n \mp 1$.

Figure 8:
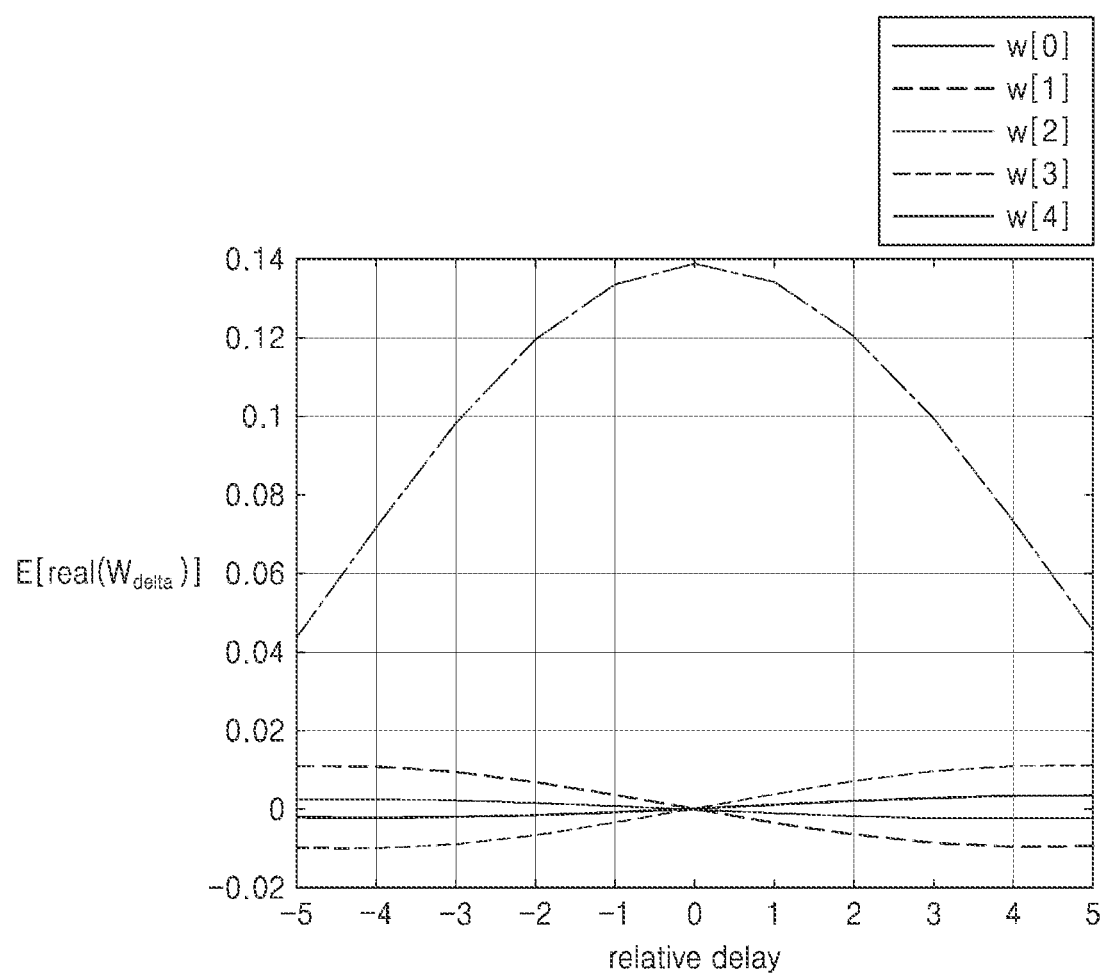
FIG. 8 is a graph illustrating an average value of a weight vector for each relative delay according to some implementations.

FIG. 8 is a graph illustrating an average value of a weight vector for each relative delay according to some implementations.

Referring to FIG. 8, when the adaptive filter 550 is a 5-tap RLS, the average value of the real number part of the weight vector $\hat{w}^H(n)$ for each relative delay is shown. Referring to the graph, it may be seen that the difference in the average value of the real number part of the weight vector according to changes in the relative delay is not large at the point where there is little relative delay (=0) compared to the size of the total weight vector.

Additionally, the value of $$\frac{\partial \hat{w}^H(n)}{\partial \delta}$$

calculated while the weight vector converges after an on/off operation of at least one of the first transmission filter 110, the second transmission filter 120, and the reception filter 210 occurs, may be relatively smaller than as $$\frac{\partial u_\delta(n)}{\partial \delta}.$$

Therefore, $$\frac{\partial u_\delta(n)}{\partial \delta}$$

has a high proportion in Equation 5, and complexity may be reduced by omitting $$\frac{\partial \hat{w}^H(n)}{\partial \delta} = 0$$

to reduce complexity.

Figure 9:
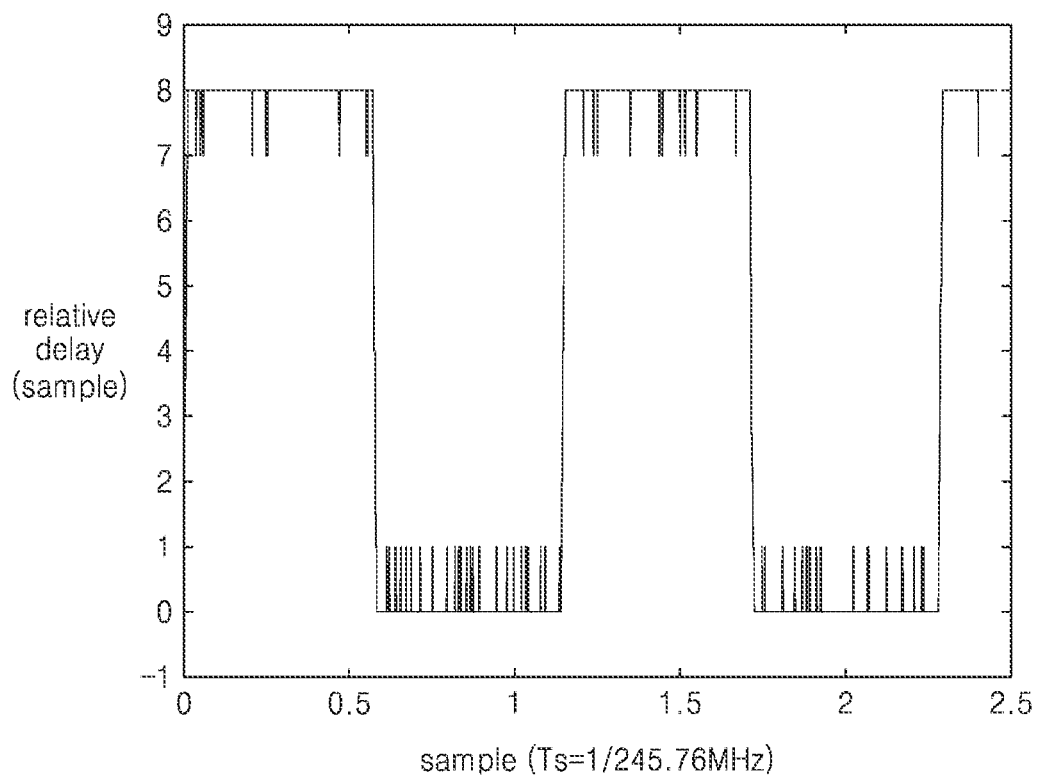
FIG. 9 is a graph illustrating a relative delay value according to some implementations.

FIG. 9 is a graph illustrating a relative delay value according to some implementations;

Referring to FIG. 9, the first transmission filter 110 may operate according to a new radio (NR) bandwidth of 50 MHz, a subcarrier interval of 15 KHz, and quadrature phase shift keying (QPSK), and the second transmission filter 120 may operate according to a long term evolution (LTE) bandwidth of 20 MHz, a subcarrier interval of 15 KHz, and QPSK.

The reception filter 210 may operate according to an NR bandwidth of 50 MHz, a subcarrier spacing (SCS) of 15 KHz, and QPSK, and the intermodulation interference was based on only $(2f_{\tau X1}-f_{\tau X2})$ of the third nonlinear terms. The relative delay was repeatedly and alternately applied with a 0 and 8 sample delay offset based on the sampling period Ts=1/245.76 MHz for each slot, and the adaptive filter 550 may be based on the 5-tap RLS. The operation frequency of the delay buffer is 245.76 MHz, and the last symbol of the slot may not be allocated.

According to some implementations, in Equation 5 to estimate the relative delay, $$\frac{\partial u_\delta(n)}{\partial \delta}$$

was approximated according to the relative delay removal circuit 500b of FIG. 7, and $$\frac{\partial \hat{w}^H(n)}{\partial \delta}$$

was approximated according to Equation 14 using a weight vector accumulated only when the relative delay was updated. Referring to FIG. 9, it may be seen that the wireless communication device 10, including the relative delay removal circuit 500, successfully follows the relative delay that changes every slot.

Figure 10:
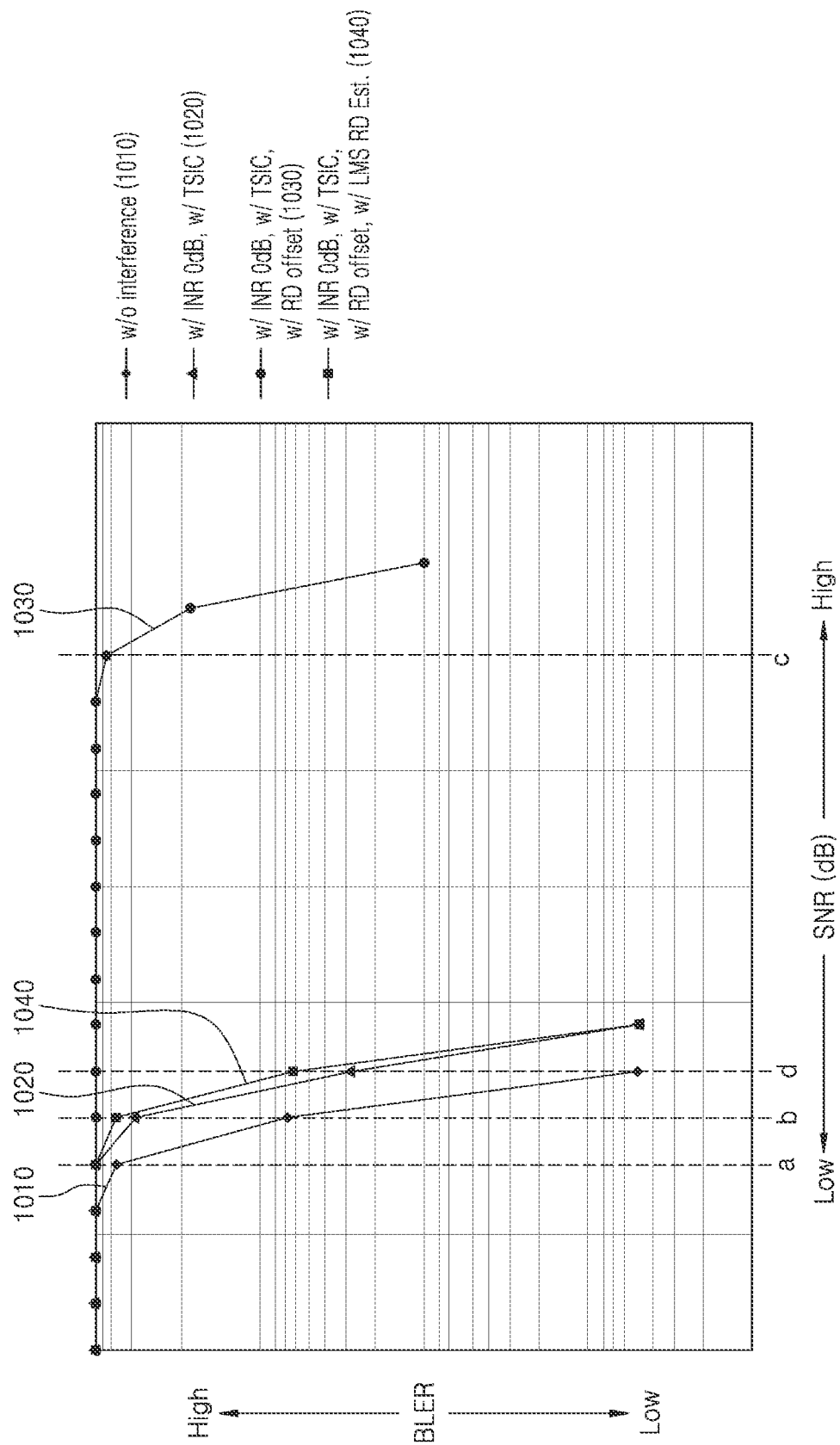
FIG. 10 is a graph illustrating performance improvement according to some implementations.

FIG. 10 is a graph illustrating performance improvement according to some implementations.

Referring to FIG. 10, when self-interference removal according to some implementations is operated in a situation where the interference-to-noise ratio (INR) is 0 dB, block error rate (BLER) performance is measured.

A first graph 1010 illustrates a BLER according to an SNR in a situation where there is ideally no interference. For example, if there is no interference, the BLER may be determined based only on noise. That is, referring to FIG. 10, it may be confirmed through the first graph 1010 that the BLER starts to decrease from a relatively low value of the first SNR value (=a).

A second graph 1020 illustrates a BLER when an INR is 0 dB and the self-interference removal is operated without the occurrence of a relative delay. That is, unlike the situation of the first graph 1010, since INR is 0 dB, interference and noise may be the same ratio and BLER may be determined based on both self-interference and noise. Therefore, as shown in FIG. 10, it may be confirmed through the second graph 1010 that the BLER is improved from the second SNR value (=b). The second SNR value may be greater than the first SNR value. Comparing the first graph 1010 to the second graph 1020, it may be seen that a larger SNR (=second SNR value) is required to lower the BLER by adding an interference component.

A third graph 1030 illustrates a BLER through the operation of self-interference removal when an INR is 0 dB and a relative delay occurs. Therefore, as shown in FIG. 10, it may be confirmed through the third graph 1030 that the BLER is improved from the third SNR value (=c).

The third SNR value may be greater than the second SNR value. Comparing the second graph 1020 to the third graph 1030, it may be seen that a larger SNR (=third SNR value) is required to lower the BLER by adding an interference component according to a relative delay.

A fourth graph 1040 shows a BLER when the relative delay removal circuit 320 is operated based on the LMS algorithm according to some implementations when the INR is 0 dB and the relative delay occurs. As shown in FIG. 10, it may be observed through the fourth graph 1040 that the BLER is improved from the second SNR value (=b). That is, when the relative delay removal circuit 320 is operated based on the LMS algorithm, almost the same performance as the environment in which the relative delay has not occurred is shown even if the relative delay occurs.

In this case, when comparing the BLERs of the second graph 1020 and the fourth graph 1040 based on the second SNR value (=b) or the fourth SNR value (=d), it may be seen that the BLER of the second graph 1020 is slightly lower. That is, a slight performance degradation of the fourth graph 1040 at the same SNR value may be based on the iteration crossing in units of a sample even after the relative delay converges. The performance degradation may be reduced by setting the relative delay control unit shorter.

Figure 11:
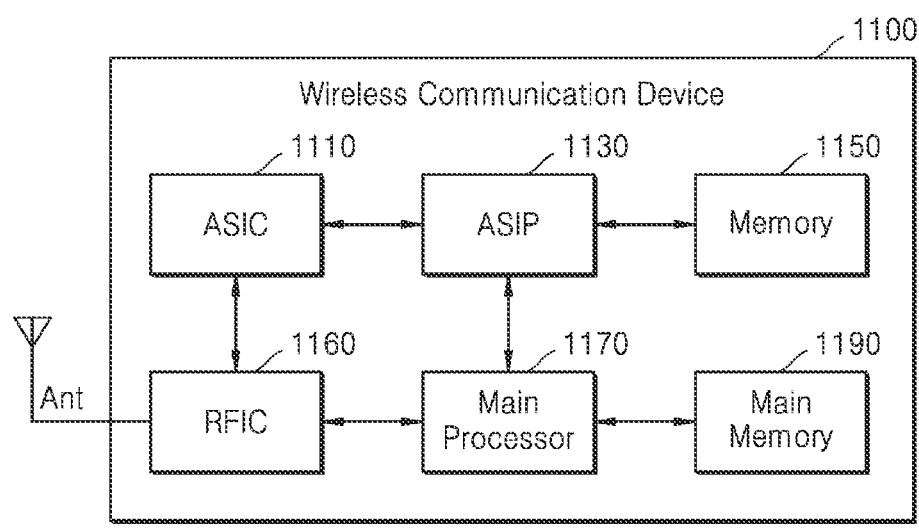
FIG. 11 is a block diagram of a wireless communication device according to some implementations.

FIG. 11 is a block diagram of a wireless communication device according to some implementations.

Referring to FIG. 11, a wireless communication device 1100 may include a modem and a radio frequency integrated circuit (RFIC) 1160, and the modem may include an application specific integrated circuit (ASIC) 1110 and an application specific instruction set processor (ASIP) 1130, a memory 1150, a main processor 1170, and a main memory 1190. The wireless communication device 1100 of FIG. 11 may be a wireless communication device 10 according to some implementations.

The RFIC 1160 may be connected to an antenna Ant to receive a signal from the outside or transmit a signal to the outside using a wireless communication network. The ASIP 1130 is a customized integrated circuit for a specific purpose, and may support a dedicated instruction set for a specific application and execute instructions included in the instruction set. The memory 1150 may communicate with the ASIP 1130 and may store a plurality of instructions executed by the ASIP 1130 as a non-transitory storage device. For example, the memory 1150 may include, as non-limiting examples, any type of memory accessible by the ASIP 1130, as in random access memory (RAM), read only memory (ROM), tape, a magnetic disk, an optical disk, volatile memory, non-volatile memory, and combinations thereof.

The main processor 1170 may control the wireless communication device 1100 by executing a plurality of instructions. For example, the main processor 1170 may control the ASIC 1110 and the ASIP 1130, process data received through a wireless communication network, or process a user input to the wireless communication device 1100.

The main memory 1190 may communicate with the main processor 1170 and may store a plurality of instructions executed by the main processor 1170 as a non-transitory storage device. For example, the main memory 1190 may include, as non-limiting examples, any type of memory accessible by the main processor 1170, as in RAM, ROM, tape, a magnetic disk, an optical disk, volatile memory, non-volatile memory, and combinations thereof.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a combination can in some cases be excised from the combination, and the combination may be directed to a subcombination or variation of a subcombination.

While the inventive concept has been particularly shown and described with reference to embodiments thereof, it will be understood that various changes in form and details may be made therein without departing from the spirit and scope of the following claims.

What is claimed is:

1. An interference cancellation circuit comprising:
 a relative delay control circuit configured to receive a first transmission signal of a first frequency and a second transmission signal of a second frequency different from the first frequency, wherein the relative delay control circuit includes a first delay buffer that is configured to delay the second transmission signal by a first delay time and a second delay buffer that is configured to delay the second transmission signal by a second delay time;
 a delay reference generation circuit configured to receive, from the relative delay control circuit, the first transmission signal and the delayed second transmission signal, and to generate reference signals corresponding to the first transmission signal and the delayed second transmission signal;
 a weight control circuit configured to update a weight vector;
 a relative delay estimation circuit configured to estimate a relative delay based on the reference signals; and
 an adaptive filter configured to generate an interference model signal based on the weight vector and a first reference signal of the reference signals and filter the interference model signal.

2. The interference cancellation circuit of claim 1, wherein the first delay time corresponds to the relative delay before an update to the relative delay, and wherein the second delay time corresponds to an interference sampling period.

3. The interference cancellation circuit of claim 2, wherein the delay reference generation circuit comprises:
 a first reference circuit configured to generate the first reference signal based on the first transmission signal without a delay and the second transmission signal with a delay of the first delay time;
 a second reference circuit configured to generate a second reference signal based on the first transmission signal without a delay and the second transmission signal without a delay; and
 a third reference circuit configured to generate a third reference signal based on the first transmission signal without a delay and the second transmission signal with a delay of the second delay time.

4. The interference cancellation circuit of claim 3, wherein the weight control circuit is configured to, based on the first reference signal, update the weight vector according to an adaptive filter algorithm including at least one of a least mean square (LMS) algorithm, a recursive least square (RLS) algorithm, or a dichotomous coordinate descent-RLS (DCD-RLS) algorithm.

5. The interference cancellation circuit of claim 3, wherein the relative delay estimation circuit is configured to update the relative delay according to an adaptive filter algorithm including at least one of a least mean square (LMS) algorithm, a recursive least square (RLS) algorithm, or a dichotomous coordinate descent-RLS (DCD-RLS) algorithm, based on the first reference signal, the second reference signal, and the third reference signal.

6. The interference cancellation circuit of claim 5, wherein the relative delay estimation circuit is configured to approximate a partial differential value for a relative delay of the first reference signal by multiplying a value by a difference between the third reference signal and the second reference signal, the value being obtained by dividing a sampling period of a reception filter by an interference sampling period.

7. The interference cancellation circuit of claim 6, wherein the relative delay estimation circuit is configured to approximate a partial differential value for a relative delay of the weight vector.

8. The interference cancellation circuit of claim 7, wherein the relative delay estimation circuit is configured to calculate an updated relative delay by using the partial differential value for the relative delay of the weight vector and the partial differential value for the relative delay of the first reference signal.

9. An interference cancellation circuit comprising:
 a relative delay control circuit configured to receive a first transmission signal of a first frequency and a second transmission signal of a second frequency different from the first frequency, wherein the relative delay control circuit includes a first delay buffer that is configured to delay the second transmission signal by a relative delay, and a second delay buffer that is configured to delay, by an interference sampling period, the second transmission signal delayed by the relative delay;
 a delay reference generation circuit configured to receive, from the relative delay control circuit, the first transmission signal, the second transmission signal delayed through the first delay buffer, and the second transmission signal delayed through the second delay buffer, to generate a first reference signal based on the first transmission signal and the second transmission signal delayed through the first delay buffer, and to generate a second reference signal based on the first transmission signal and the second transmission signal delayed through the second delay buffer;

a weight control circuit configured to update a weight vector;

a relative delay estimation circuit configured to estimate a relative delay based on the first reference signal and the second reference signal; and an adaptive filter configured to generate an interference model signal based on the weight vector and the first reference signal and filter the interference model signal from a received signal.

10. The interference cancellation circuit of claim 9, wherein the relative delay estimation circuit is configured to update the relative delay according to at least one of a least mean square (LMS) algorithm, a recursive least square (RLS) algorithm, or a dichotomous coordinate descent-RLS (DCD-RLS) algorithm based on the first reference signal and the second reference signal.

11. The interference cancellation circuit of claim 9, wherein the weight control circuit is configured to, based on the first reference signal, update the weight vector according to at least one of a least mean square (LMS) algorithm, a recursive least square (RLS) algorithm, or a dichotomous coordinate descent-RLS (DCD-RLS) algorithm.

12. The interference cancellation circuit of claim 9, wherein the relative delay estimation circuit is configured to approximate a partial differential value for a relative delay of the first reference signal by multiplying a value by a difference between the second reference signal and the first reference signal, the value being obtained by dividing a sampling period of a reception filter by the interference sampling period.

13. The interference cancellation circuit of claim 12, wherein the relative delay estimation circuit is configured to approximate a partial differential value for a relative delay of the weight vector.

14. The interference cancellation circuit of claim 13, wherein the relative delay estimation circuit is configured to calculate an updated relative delay by using the partial differential value for the relative delay of the weight vector and the partial differential value for the relative delay of the first reference signal.

15. A method for interference cancellation, the method comprising:

generating first, second, and third reference signals;

calculating a partial differential value for a relative delay of the first reference signal;

calculating a partial differential value for a relative delay of a weight vector; and estimating the relative delay of the first reference signal by using the partial differential value for the relative delay of the weight vector and the partial differential value for the relative delay of the first reference signal, wherein the first reference signal corresponds to a signal that is obtained by modelling an intermodulation interference based on a first transmission signal without a delay and a second transmission signal with a relative delay of the second transmission signal, the second reference signal corresponds to a signal that is obtained by modelling an intermodulation interference based on the first transmission signal and the second transmission signal without a delay, and the third reference signal corresponds to a signal that is obtained by modelling an intermodulation interference based on the first transmission signal and a third transmission signal with a delay of an interference sampling period.

16. The method of claim 15, wherein the calculating of the partial differential value for the relative delay of the first reference signal comprises:

approximating a partial differential value for the relative delay of the first reference signal, by multiplying a value by a difference between the third reference signal and the second reference signal, the value being obtained by dividing a sampling period of a reception filter by the interference sampling period.

17. The method of claim 15, wherein the calculating of the partial differential value for the relative delay of the weight vector is based on a weight vector calculated by accumulating each time that the relative delay is updated.

18. The method of claim 15, wherein the estimating of the relative delay of the first reference signal comprises updating the relative delay of the first reference signal according to an adaptive filter algorithm based on the first reference signal, the second reference signal, and the third reference signal, and wherein the adaptive filter algorithm includes at least one of a least mean square (LMS) algorithm, a recursive least square (RLS) algorithm, or a dichotomous coordinate descent-RLS (DCD-RLS) algorithm.

19. The method of claim 18, wherein the calculating of a partial differential value for the relative delay of the weight vector comprises, based on the value of the updated relative delay being less than or equal to a threshold value, calculating the partial differential value for the relative delay of the weight vector to be 0.

20. The method of claim 15, wherein the calculating of the partial differential value for the relative delay of the first reference signal comprises approximating the partial differential value for the relative delay of the first reference signal by multiplying a value by a difference between the third reference signal and the second reference signal, the value being obtained by dividing a sampling period of a reception filter by the interference sampling period.

* * * * *